United States Patent [19]

Church

[11] 4,283,707
[45] Aug. 11, 1981

[54] AIRCRAFT LOW PRESSURE TIRE WARNING SYSTEM HAVING COMPARATOR CIRCUIT FOR EACH AXLE PAIR OF A FOUR WHEEL BOGIE CONFIGURATION

[75] Inventor: Royce F. Church, Lynnwood, Wash.

[73] Assignee: The Boeing Company, Seattle, Wash.

[21] Appl. No.: 57,137

[22] Filed: Jul. 12, 1979

[51] Int. Cl.$^3$ .................. B60C 23/00; G08G 1/12
[52] U.S. Cl. ...................... 340/58; 73/146.5; 244/103 R; 340/27 R
[58] Field of Search ............ 340/27 R, 58; 73/146.3, 73/146.4, 146.5; 200/61.22, 61.25; 244/100 A, 103 R, 104 FP

[56] References Cited

U.S. PATENT DOCUMENTS

| | | | |
|---|---|---|---|
| 2,155,903 | 4/1939 | Leavenworth | 340/58 |
| 2,279,140 | 4/1942 | Kellen | 340/58 X |
| 3,645,479 | 2/1972 | Kostroun et al. | 244/103 R |
| 3,691,524 | 9/1972 | Frost et al. | 340/58 |
| 3,707,701 | 12/1972 | Neu | 340/58 |
| 3,900,828 | 8/1975 | Lage et al. | 340/58 X |
| 4,224,597 | 9/1980 | DiCecio | 340/58 |

Primary Examiner—John W. Caldwell, Sr.
Assistant Examiner—Joseph E. Nowicki
Attorney, Agent, or Firm—Conrad O. Gardner; B. A. Donahue

[57] ABSTRACT

An aircraft low tire pressure sensing and cockpit display and warning system utilizing axle wheel pair comparator circuitry to provide signals representative of pressures of the axle wheel pair less than a predetermined value, e.g. 15 percent less than a preset value determined by tire requirements or a difference between axle wheel pair pressures greater than a given value, e.g. 25 psi. In the event of tire master warning lamp illumination on the flight deck warning display, further push button interrogation and identification of the axle pair causing the warning can be made by a crew member on the flight deck warning display.

3 Claims, 2 Drawing Figures

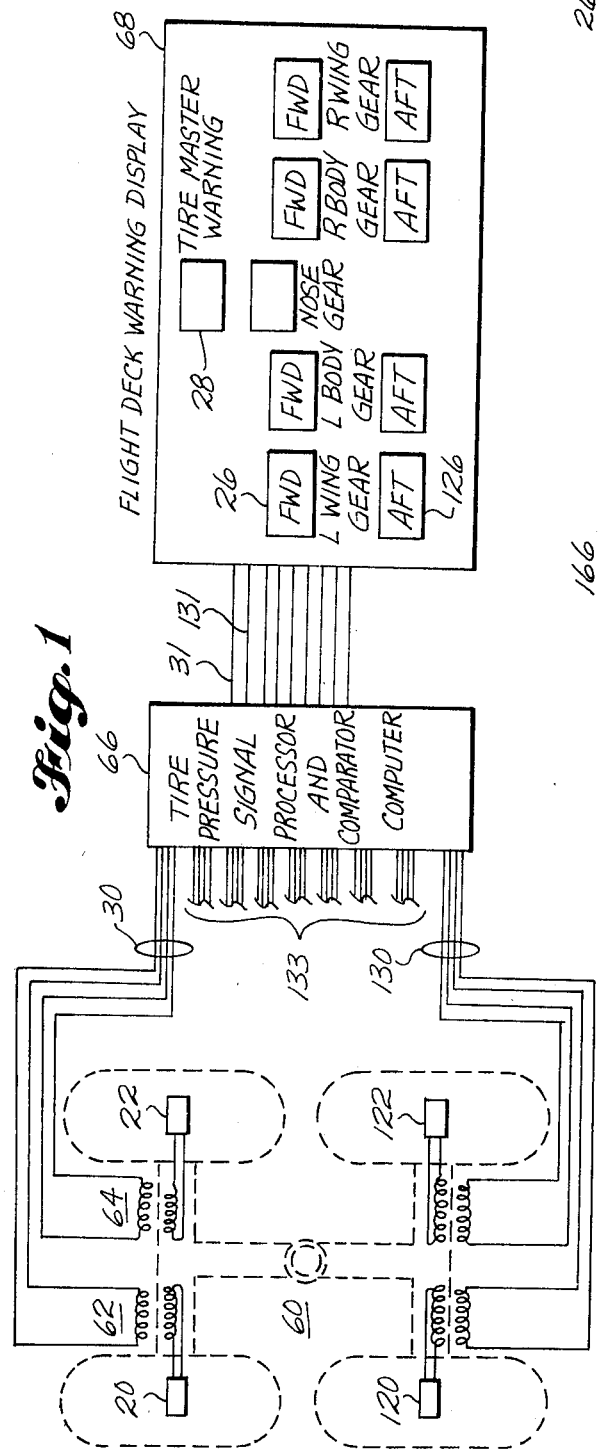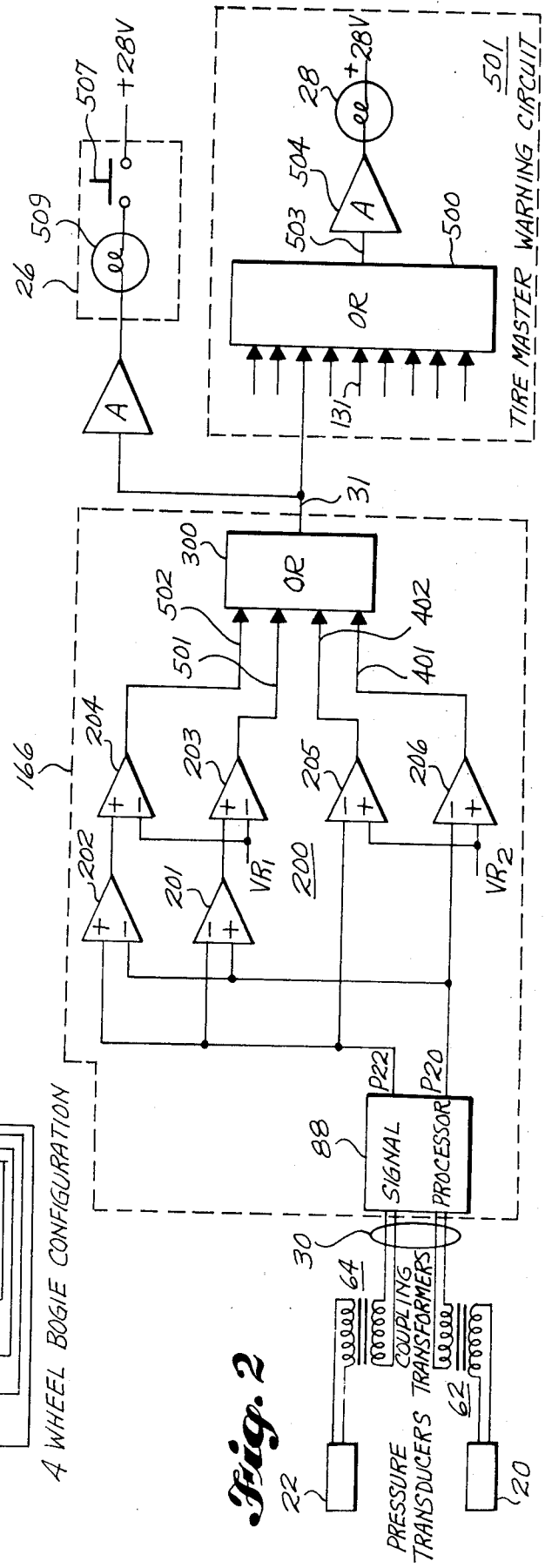

AIRCRAFT LOW PRESSURE TIRE WARNING SYSTEM HAVING COMPARATOR CIRCUIT FOR EACH AXLE PAIR OF A FOUR WHEEL BOGIE CONFIGURATION

This invention relates to aircraft low tire pressure sensing and cockpit display warning systems and more particularly to an aircraft low pressure tire warning system utilizing an axle pair tire pressure comparator method for reducing nuisance warnings caused by temperature changes.

Heretofore, ground crew monitoring of tire pressure by application of tire pressure gauges on each wheel and inspection by crew walkaround has been done, which methods do not provide flight crew warning subsequent to taxiing out to the runway for takeoff and/or have not been eliminative of human error in assessing tire pressure condition.

In the patent literature, U.S. Pat. No. 3,900,828 is illustrative of a low tire pressure warning system which utilizes an existing strain gage system used primarily for determining aircraft weight and center of gravity and in which the strain gages are disposed in the axles with one set of strain gages associated with each wheel. Diagonally disposed strain gages on each aircraft undercarriage support structure point carrying wheels or bogie are compared and in the event that all tires are properly inflated, the compared outputs should be close to each other. A flat or seriously deflated tire will cause the associated strain gage output to fall far below the outputs from the other three transducers associated with the other tires to which all or most of the load carrying function has been shifted. The diagonal-pair electrical comparison will then exhibit a large percentage difference thereby signifying a tire fault in contrast to a feature of the present system wherein pressure comparison per axle pairs is provided.

A further reference in the patent literature shown in U.S. Pat. No. 3,922,639 shows inductively transmitted tire pressure signals subtractively combined in pairs in a transformer for giving an alarm when a tire has low pressure or is in a flat condition. Such system is not determinative of which tire has the low pressure and cannot be interrogated as the present system.

It is accordingly an object of the present invention to provide parallel coupling of axle pair pressure signal processing circuits to a tire master warning circuit.

It is another object of the present invention to provide a method and apparatus for interrogating wheel axle pairs subsequent to tire master warning light illumination.

It is yet another object of the present invention to provide a tire master warning circuit having an OR gate for receiving signals representative of axle wheel pair pressure differentials exceeding a preset value or individual axle wheel pressures below a predetermined value.

Further and more specific objects and advantages of the invention are made apparent in the following specification wherein the invention is described in detail by reference to the accompanying drawings wherein:

FIG. 1 is a schematic view of a four wheel bogie configuration (representative of a Boeing 747 type aircraft) of an aircraft undercarriage support structure including a system block diagram of associated comparator and tire pressure signal processor which are coupled to a flight deck warning display in accordance with a preferred embodiment of the present invention; and, FIG. 2 is a circuit diagram of a single axle pair signal processing circuit utilized in the system of FIG. 1.

Turning now to FIG. 1, it will be noted that a four wheel bogie configuration 60 from the left wing gear is shown with pressure transducers 20 and 22 from the forward wheels connected respectively through coupling transformers 62 and 64 and leads 30 to tire pressure signal processor and comparator computer circuit 66. A tire pressure warning signal 31 is provided from tire pressure signal processor and comparator computer circuit 66 which energizes tire master warning light 28 of flight deck warning display 68 in the event of undesired tire pressure conditions sensed at transducers 20 and 22. In the event of energization of tire master warning light 28, interrogation of warning lamp switch 26 by application of finger pressure thereto will cause energization thereof with resultant identification of the affected forward wheels of the left wing gear whereas push to test of the other interrogation warning lamp switches of flight deck warning display 68 would not lead to identification of undesired tire pressure conditions of the left wing gear forward wheel axle pair.

Similar signal processing from aft wheel pressure transducers 120 and 122 via leads 130 and tire pressure signal processor and comparator computer circuit 66 will result in a tire pressure warning signal 131 thereby energizing tire master warning light 28 of flight deck warning display 68 in the event of undesired tire pressure conditions sensed at transducers 120 and 122, and in the interrogation at flight deck warning display 68 of warning lamp switches, illumination of warning lamp switch 126 will result in positive identification of the affected bogie wheel axle pair. Corresponding sets of leads 133 provide transducer signals from other axle pairs from bogies of remaining body gears for processing and utilization at tire master warning lamp 28 and interrogation for positive identification at the remaining warning lamp press to test switches of flight deck warning display 68.

Turning now to the circuit schematic of FIG. 2 showing signal processing for a single axle pair of tires, viz. from the forward left wing gear pair carrying tire pressure transducers 20 and 22, it will be observed that coupling transformers 62 and 64 respectively transmit signals 30 proportional to pressure which are converted in known manner to output D.C. pressure signals $P_{20}$ and $P_{22}$ by signal processor 88. Tire pressure signal processor and comparator circuit 166 (one such circuit provides each axle wheel pair signal processing channel of tire pressure signal processor and comparator computer circuit 66) includes comparator circuit 200 comprising comparator amplifiers 201, 202, 203, 204, 205, and 206 and logic gate 300 coupled downstream to provide tire pressure warning signal 31. Logic gate 300 is an OR gate and comparator amplifiers 201, 202, 203, 204, 205, and 206 comprise operational amplifiers with differential inputs connected as shown. Comparator amplifiers 205 and 206 of comparator circuit 200 are responsive to D.C. voltages $P_{20}$ and $P_{22}$ representative of tire pressures at transducers 20 and 22 to provide comparator circuit 200 output signals 401 or 402 when a tire pressure of the axle pair becomes less than a voltage $VR_2$ representative of a predetermined tire pressure value, e.g. 15 percent less than a preset value determined by tire requirements. D.C. voltage signals $P_{20}$ and $P_{22}$ representative of the left wing gear forward axle tire pair pressures are also coupled to comparator amplifiers 201 and 202 and the difference output therefrom coupled to comparator amplifiers 203 and 204 so that comparator circuit 200 output signals 501, 502 are generated if the difference between pressures of the axle wheel pair exceeds a given value, e.g. a signal $VR_1$ representative of 25 psi. OR logic gate 300 is responsive to signals 401, 402, 501, and 502 to provide tire pressure warning signal 31 in the presence of any one or more of OR gate input signals 401, 402, 501 and 502.

In the presence of tire pressure warning signal 31 indicative of undesired tire pressure conditions of the left wing gear forward wheel axle pair or tire pressure warning signal 131 indicative of undesired tire pressure conditions of the left wing gear aft wheel axle pair or tire pressure warning signal indicative of undesired tire pressure conditions of other wing gear forward or aft wheel axle pairs then OR circuit 500 (of tire master warning circuit 501) responsive to one or more of such tire pressure warning signals will provide tire master warning signal 503 which upon amplification in lamp driver amplifier circuit 504 will cause energization of tire master warning light 28 for observation of flight deck warning display 68.

Upon energization of master warning light 28 in flight deck warning display panel 68, the crew member making such observation will desire identification of the specific axle pair causing master warning light 28 to illuminate, and pressing of the warning lamp switch on warning display panel 68 associated with the axle pair which caused master warning light 28 to illuminate, e.g. pressure switch 507 associated with the forward axle pair of the left wing gear will result in lamp 509 of warning lamp switch 26 to illuminate.

While a single axle pair tire pressure signal processing and comparator circuit 166 as shown in FIG. 2 has been described, further circuits for the remaining axle pairs are provided in tire pressure signal processor and comparator computer 66 and are coupled downstream to the inputs of OR circuit 500 of tire master warning circuit 501, each tire pressure signal processing and comparator circuit having the hereinbefore described interrogating circuit feature provided through respective press to test warning lamp switches on flight deck warning display panel 68.

I claim:

1. In an aircraft low pressure tire warning system having a flight deck warning display and first and second pressure transducers associated with first and second tires respectively of an axle pair:
   means responsive to said first and second pressure transducers for providing first and second signals representative of said first and second tires;
   a tire pressure signal processor and comparator circuit responsive to said first and second signals for providing signals representative of pressure conditions of said tires less than a preselected percentage of a preset value and further providing signals representative of wheel pair pressure differentials greater than a given value; and
   said tire pressure signal processor and comparator circuit including a logic gate having an output terminal for providing a tire pressure warning signal in the event that at least one of said first and second tire pressures is less than a preselected percentage of a preset value or said first and second tire pressure differentials exceed a given value.

2. In combination:
   a first wheel pair having tire pressures and a tire pressure differential;
   a first tire pressure signal processor and comparator circuit for providing a first warning signal under the conditions of at least one of the tire pressures is less than a preselected percentage of a preset value or the tire pressure differential of said first wheel pair exceed a given value;
   a second wheel pair having tire pressures and a tire pressure differential;
   a second tire pressure signal processor and comparator circuit for providing a second warning signal under the conditions of at least one of the tire pressures is less than said preselected percentage of a preset value or the tire pressure differential of said second wheel pair exceed said given value; and,
   a tire master warning circuit having an OR gate responsive to the presence of said first or second warning signals for illuminating a tire master warning light.

3. The invention according to claim 2 further including warning lamp switching means associated with each of said first and second wheel pairs for identifying the wheel pair causing said tire master warning light to illuminate in the event of the presence of said first or second warning signals.

* * * * *